US012767599B2

(12) United States Patent
Kaiser et al.

(10) Patent No.: US 12,767,599 B2
(45) Date of Patent: Oct. 20, 2026

(54) SULFATE-POOR CALCIUM-CONTAINING POROUS MINERAL MATERIALS

(71) Applicant: FRAUNHOFER-GESELLSCHAFT ZUR FÖRDERUNG DER ANGEWANDTEN FORSCHUNG E. V., Munich (DE)

(72) Inventors: Christian Kaiser, Valley (DE); Volker Thome, Valley (DE); Severin Seifert, Valley (DE); Sebastian Dittrich, Valley (DE); Georg Schober, Landau an der Isar (DE)

(73) Assignee: FRAUNHOFER-GESELLSCHAFT ZUR FÖRDERUNG DER ANGEWANDTEN FORSCHUNG E. V., Munich (DE)

( * ) Notice: Subject to any disclaimer, the term of this patent is extended or adjusted under 35 U.S.C. 154(b) by 640 days.

(21) Appl. No.: 18/015,763

(22) PCT Filed: Jun. 30, 2021

(86) PCT No.: PCT/EP2021/067937
§ 371 (c)(1),
(2) Date: Jan. 12, 2023

(87) PCT Pub. No.: WO2022/012928
PCT Pub. Date: Jan. 20, 2022

(65) Prior Publication Data

US 2023/0219850 A1 Jul. 13, 2023

(30) Foreign Application Priority Data

Jul. 13, 2020 (DE) ........................ 102020118403.4

(51) Int. Cl.

| | |
|---|---|
| ***C04B 28/18*** | (2006.01) |
| ***C04B 14/06*** | (2006.01) |
| ***C04B 14/28*** | (2006.01) |
| ***C04B 24/38*** | (2006.01) |
| ***C04B 38/10*** | (2006.01) |

(52) U.S. Cl.
CPC .............. *C04B 28/18* (2013.01); *C04B 14/06* (2013.01); *C04B 14/28* (2013.01); *C04B 24/38* (2013.01); *C04B 38/103* (2013.01); *C04B 2201/20* (2013.01)

(58) Field of Classification Search
CPC ......... C04B 28/18; C04B 14/06; C04B 14/28; C04B 24/38; C04B 38/103; C04B 2201/20; C04B 28/10; C04B 2111/1018; C04B 28/006; Y02P 40/10; Y02P 40/60; Y02W 30/91
See application file for complete search history.

(56) References Cited

U.S. PATENT DOCUMENTS

| | | | | |
|---|---|---|---|---|
| 3,989,534 | A * | 11/1976 | Plunguian | ............... C04B 28/02 106/646 |
| 6,646,086 | B2 | 11/2003 | Slone | |
| 2003/0219580 | A1 | 11/2003 | Tagge et al. | |
| 2010/0252946 | A1 | 10/2010 | Stumm | |
| 2011/0039984 | A1 | 2/2011 | Bühler et al. | |

FOREIGN PATENT DOCUMENTS

| | | | | |
|---|---|---|---|---|
| BR | 9605186 | A * | 9/1997 | ............. C04B 14/28 |
| CN | 1462280 | A | 12/2003 | |
| CN | 102007084 | A | 4/2011 | |
| CN | 105198298 | A * | 12/2015 | |
| CN | 106278341 | A * | 1/2017 | ............. C04B 35/80 |
| CN | 107598070 | A * | 1/2018 | ............... B22C 1/00 |
| CN | 108264276 | A | 7/2018 | |
| DE | 19632666 | C1 | 4/1998 | |
| JP | 2011042551 | A | 3/2011 | |
| JP | 2011516379 | A | 5/2011 | |
| JP | 2014062014 | A | 4/2014 | |
| KR | 1020130010046 | A | 1/2013 | |
| KR | 102079643 | B1 | 2/2020 | |
| WO | 2004087605 | A1 | 10/2004 | |
| WO | 15087168 | A2 | 6/2015 | |
| WO | 2020037349 | A1 | 2/2020 | |
| WO | 2020037349 | A2 | 2/2020 | |

OTHER PUBLICATIONS

International Search Report for PCT/EP2021/067937 dated Oct. 21, 2021, 4 pages.
Chinese Office Action with English translation for Chinese Application No. 202180051977.4 mailed Jun. 21, 2024, 14 pages.
Office Action with English translation for Chinese Application No. 202180051977.4 dated Jan. 24, 2025, 15 pages.
Udawatte C P et al, "Solidification of xonotlite fibers with chitosan by hydrothermal hot pressing", Materials Letters, Elsevier, Amsterdam, NL, (Oct. 1, 2000), vol. 45, No. 6, doi:10.1016/S0167-577X(00)00121-X, ISSN 0167-577X, pp. 298-301, XP004256571.
German Wikipedia, "Chitosan", (Mar. 7, 2020), URL: https://de.wikipedia.org/wiki/Chitosan, (Oct. 13, 2021), XP055850724, 8 pages.
English Wikipedia of "Chitosan", URL: https://en.wikipedia.org/wiki/Chitosan, retrieved Mar. 29, 2024, 15 pages.
Office Action for Korean Patent Application No. 10-2023-7003780 dated Oct. 24, 2025, 22 pages.
Lee, et al. "Study on a Concrete Repair Material Mixed with Seaweed Powder", Journal of Korean Society of Urban Railway, vol. 5, No. 4, pp. 1035-1043, Dec. 2017.

(Continued)

*Primary Examiner* — Anthony J Green
(74) *Attorney, Agent, or Firm* — Lowenstein Sandler LLP

(57) ABSTRACT

The present invention relates to calcium-containing, porous, mineral materials having a sulfate content of not more than 1.5% by weight and a biopolymer content in the range of 0.001 to 5.00% by weight, each relative to the total weight of the materials, a method for producing these materials with the aid of biopolymers as stabilizers and the use of biopolymers for producing sulfate-poor calcium-containing, porous, mineral materials.

14 Claims, 2 Drawing Sheets

(56) References Cited

OTHER PUBLICATIONS

Engbert, A. et al., "The effect of alginates on the hydration of calcium aluminate cement", Carbohydrate Polymers, Applied Science Publishers , Ltd Barking, GB, Bd. 236, Feb. 20, 2020 (Feb. 20, 2020), XP086086189, ISSN: 0144-8617, DOI: 10.1016/J. CARBPOL. 2020.116038 [gefunden am Feb. 20, 2020].

Office Action for European Patent Application No. 21 742 318.5-1014, mailed Feb. 20, 2026, 09 pages.

Notice of Allowance for Korean Patent Application No. 10-2023-7003780 dated Aug. 26, 2026, 6 pages.

* cited by examiner

SULFATE-POOR CALCIUM-CONTAINING POROUS MINERAL MATERIALS

CROSS REFERENCE TO RELATED APPLICATION(S)

The present application is a national stage entry under 35 U.S.C. § 371 of International Application No. PCT/EP2021/067937, filed on Jun. 30, 2021, which claims priority to German Patent Application No. 10 2020 118 403.4, filed on Jul. 13, 2020. The contents of these applications are hereby incorporated by reference in their entirety.

FIELD OF THE INVENTION

The present invention relates to calcium-containing porous mineral materials having a sulfate content of not more than 1.5% by weight and a biopolymer content of 0.001% to 5.0% by weight, in each case based on the total weight of the materials, to a process for producing said materials with the aid of biopolymers as stabilizers, and to the use of biopolymers for producing low-sulfate, calcium-containing porous mineral materials.

TECHNICAL BACKGROUND

Light porous materials in the construction sector are efficient products that, in addition to a wide range of uses, are able to bring about a useful conservation of resources on account of their low density. Despite the reduction in mass, it is however necessary for important material parameters (for example compressive strength, flexural strength, etc.) to be attained and the processes used in production are accordingly highly technical and standardized. In the production of calcium-containing porous building materials such as autoclaved aerated concrete, foamed concrete, foamed cement, lime foam or similar, what is critical to the quality of the end product and must accordingly be controllable is for example the stabilization of articles and molding compounds—the so-called green bodies—after the foaming or porosification process. As a general rule, the more porous the building material to be produced, the more unstable the green bodies. Since it is possible, for material-related reasons, to adapt the basic formulations only to a limited extent, additives are accordingly added for stabilization or for optimization of particular properties. However, their negative effects must also be taken into account here, these relating up to now mostly to ecological aspects. This is evident particularly in the $CO_2$ emissions arising during production or even in the recyclability of these materials. Autoclaved aerated concrete can be taken as an example here. Cement and/or sources of calcium sulfate, such as anhydrite/gypsum/bassanite, are added to the formulations as stabilizers. Although the materials can serve also as sources of calcium and silicate, their stabilizing function means they are added predominantly as functional additives that are not required for the formation of the main components in autoclaved aerated concrete, the tobermorites. Something that must be taken into account here is that substances such as anhydride/gypsum/bassanite and also cement (sulfate content of approx. 5% serves as a reaction regulator) result in a higher landfill class for the building material at the end of its service life, since the sulfate-containing components thereof are readily leached and can enter the soil or groundwater. The consequences of using cement are relevant even during production and are reflected in the $CO_2$ equivalents in particular. The aspects mentioned are known and have already been an element of some studies, but these have up to now been “unimportant” for the product economy. It is only with the associated societal change that this view has changed significantly and scientists and manufacturers are encouraged to present novel solutions.

Existing and most commonly used solutions for stabilizing the green body are currently based on the following approaches:

1. Additives that influence the “setting behavior” of the green bodies or end products
   Daake, Henning-Felix from (2016): Möglichkeiten zur Optimierung der Wirkungsweise bauchemischer Zusatzmittel durch Mechanismen der kontrollierten Wirkstofffreisetzung [Options for optimizing the mode of action of construction chemical additives through mechanisms of controlled active substance release]. Dissertation. Technical University; Kassel University Press GmbH, Berlin
   a. Calcium oxide:
      Tungulin, Dmitry; Behrenberg, Birgit; Lutter, Jürgen; Wallmeier, Werner (2018): Quicklime with defined reaction time window for aerated autoclaved concrete production. In: ce/papers 2 (4), pp. 223-229
   b. Cement, anhydrite, gypsum (hemihydrate):
      Baltakys, K.; Siauciunas, R. (2010): Influence of gypsum additive on the gyrolite formation process. In: Cement and Concrete Research 40 (3), pp. 376-383;
      Małecki, Marek; Kurdowski, Wiesław; Walczak, Paweł (2018): Influence of gypsum and limestone, used as mineral additives, on autoclaved aerated concrete properties. In: ce/papers 2 (4), pp. 231-234
   c. Ashes:
      Walczak, Paweł; Szymański, Paweł; Różycka, Agnieszka (2015):
      Autoclaved Aerated Concrete based on Fly Ash in Density 350 kg/m$^3$ as an Environmentally Friendly Material for Energy-Efficient Constructions. In: Procedia Engineering 122, pp. 39-46;
      Winkels, Bernd; Nebel, Holger; Raupach, Michael (2018): Carbonation of autoclaved aerated concrete containing fly ash. In: ce/papers 2 (4), pp. 47-51
   d. Alumosilicates:
      Matsushita, Fumiaki; Imasawa, Kouichi; Shibata, Sumio; Horiguchi, Masatoshi (2018): Aluminum silicate recycling raw materials for production of autoclaved aerated concrete. In: ce/papers 2 (4), pp. 215-221;
      Grabowska, Ewelina (2018): Zeolites as a raw material to the AAC production. In: ce/papers 2 (4), pp. 201-206
   e. Pozzolans:
      Luke, K. (2004): Phase studies of pozzolanic stabilized calcium silicate hydrates at 180° C. In: Cement and Concrete Research 34 (9), pp. 1725-1732
2. Additives that act as reinforcement and strengthen the supporting structure, for example glass fibers, carbon fibers, cellulose fibers, synthetic polymer fibers, etc.
   Stadie, R., (2008): Festigkeits- and Verformungsverhalten von kurzfaserverstärktem Porenbeton [Strength behavior and deformation behavior of autoclaved aerated concrete reinforced with short fibers]. Dissertation, Berlin: Technical University of Berlin;

Laukaitis, A.; Keriené, J.; Mikulskis, D.; Sinica, M.; Sezemanas, G. (2009): Influence of fibrous additives on properties of aerated autoclaved concrete forming mixtures and strength characteristics of products. In: Construction and Building Materials 23 (9), pp. 3034-3042;

Laukaitis, Antanas; Keriené, Jadvyga; Kligys, Modestas; Mikulskis, Donatas; Lekūnaitė, Lina (2012): Influence of mechanically treated carbon fibre additives on structure formation and properties of autoclaved aerated concrete. In: Construction and Building Materials 26 (1), pp. 362-371;

Laukaitis, A.; Keriené, J.; Mikulskis, D.; Sinica, M.; Sezemanas, G. (2009a): Influence of fibrous additives on properties of aerated autoclaved concrete forming mixtures and strength characteristics of products. In: Construction and Building Materials 23 (9), pp. 3034-3042;

Karlstetter, C., (2013): Verbesserung der Leistungsfähigkeit von Porenbeton durch den Einsatz von Fasern [Improving the performance of autoclaved aerated concrete through the use of fibers]. Dissertation, Munich: University of the German Federal Armed Forces Munich.

3. Additives that influence the water balance/viscosity and thus prevent molded bodies that have not yet solidified from drifting apart, for example polyvinyl alcohol, etc.:
   Akthar, F. K.; Evans, J. R. G. (2010): High porosity (>90%) cementitious foams. In: Cement and Concrete Research 40 (2), pp. 352-358
4. Utilization of different particle size distributions:
   Isu, Norifumi; Teramura, Satoshi; Ishida, Hideki; Mitsuda, Takeshi: Influence of quartz particle size on the chemical and mechanical properties of autoclaved aerated concrete (II) fracture toughness, strength and micropore; Park, Seung Bum; Yoon, Eui Sik; Lee, Burtrand I. (1999): Effects of processing and materials variations on mechanical properties of lightweight cement composites. In: Cement and Concrete Research 29 (2), pp. 193-200
5. Adjustment of the water/solid ratio:
   Wu, Lixian; Peng, Xiaoqin; Yang, Junfeng; Bai, Guang (1996): Influence of some technology parameters on the structures of autoclaved lime-sand concrete. In: Cement and Concrete Research 26 (7), pp. 1109-1120

The present invention describes now a novel process with which additives such as cement, gypsum/anhydrite/bassanite or others such as amorphous silica, pozzolans, etc. can be partially or completely replaced in the production of said calcium-containing porous mineral materials through the use of biomimetics, this being accompanied also by stabilization of the porosified body. This results in hitherto unforeseen economic and ecological advantages for this type of building material. For example, the $CO_2$ equivalents can be significantly reduced by dispensing with cement. Moreover, the reduction in sulfate content means that the building materials fall into a lower landfill class.

SUMMARY OF THE INVENTION

The present invention relates to calcium-containing porous mineral materials having a sulfate content of not more than 1.5% by weight and a content of biopolymers in the range from 0.001% to 5.00% by weight, in each case based on the total weight of the materials.

In addition, the present invention relates to a process for producing calcium-containing porous mineral materials as described herein, comprising the following process steps:

a) producing an aqueous suspension comprising a calcium oxide source, optionally one or more further mineral raw material sources, and one or more biopolymers;
b) producing a green body from the suspension from process step a);
c) hardening of the green body from process step b);
d) obtaining the calcium-containing porous mineral material.

Lastly, the present invention relates to the use of biopolymers for producing low-sulfate, calcium-containing porous mineral materials.

DEFINITIONS

Figure 1:
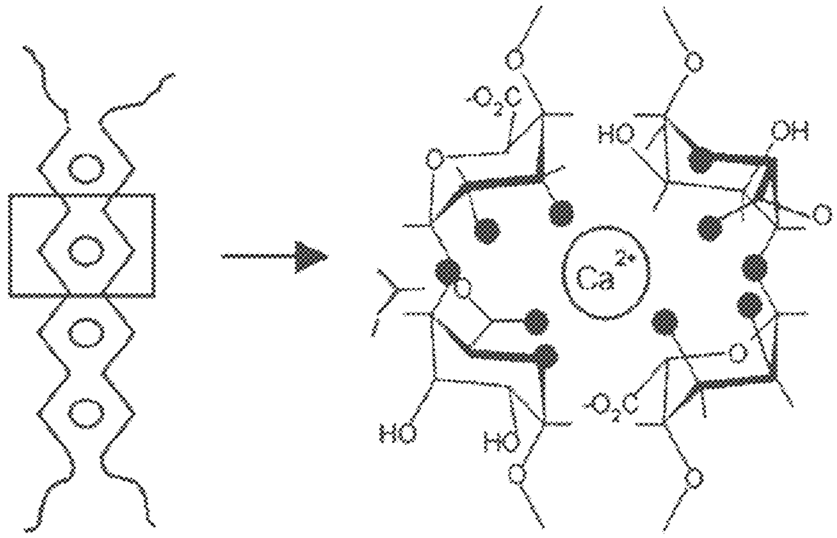
FIG. 1 shows the schematic representation of an example of the "egg-box" model in connection with calcium alginates (source: Fu, Shao; Thacker, Ankur; Sperger, Diana M.; Boni, Riccardo L.; Buckner, Ira S.; Velankar, Sachin et al. (2011): Relevance of rheological properties of sodium alginate in solution to calcium alginate gel properties. In: AAPS PharmSciTech 12 (2), pp. 453-460).

Mineral materials are for the purposes of the present invention inorganic, non-metallic materials composed of natural minerals or shaped mixtures of materials composed of sieved or ground minerals, which obtain the desired strength through the use of binders, optionally with a special hardening process. Excluded from the term mineral materials are for the purposes of the present invention wood, metallic materials, glass, plastics, and composites produced from these materials.

Calcium-containing porous mineral materials are mineral materials according to the above definition that have an at least detectable content of calcium and in which intentional pore formation is also detectable.

A biopolymer is a polymer synthesized in cells of living beings (native polymer). For the purposes of the present invention, the term biopolymer also encompasses biopolymers that can be modified from organic compounds in cells of living beings (for example by fermentation in bacteria) and obtained therefrom (biogenic polymers), and also derivatives of biopolymers. Biodegradable petroleum-based polymers do not for the purposes of the present invention come under the term biopolymers.

A low-sulfate material has a sulfate content of not more than 1.5% by weight based on the total weight of the material.

A sulfate-free material has no measurable sulfate content.

General Description of the Invention

The present invention relates to calcium-containing porous mineral materials having a sulfate content of not more than 1.5% by weight and a content of biopolymers in the range from 0.001% to 5.00% by weight, in each case based on the total weight of the materials.

The calcium-containing porous mineral materials are preferably selected from the following list:

- Autoclaved aerated concrete
- Foamed concrete/foamed cement
- Alkali-activated building materials (geopolymers)
- Porous refractory materials (refractory ceramics, refractory concrete), i.e. materials that are used in high-temperature processes (>600° C.) or for lining furnaces or thermal aggregates
- Porous mineral insulation materials for the construction industry based on foamed concrete (hydraulic) or aerated concrete (autoclaved)
- Porous mineral insulation materials for industrial insulation of pipes, containers, boilers, furnaces, heating cabinets based on foamed concrete (hydraulic) or aerated concrete (autoclaved)
- Foamed ceramic
- Lime foam
- Porous air-hardening lime hardened by carbonation in air or a $CO_2$-enriched atmosphere or in liquid $CO_2$
- Mineral-based porous sound absorbers
- Porous granulates for lightweight concrete Preference is given to calcium-containing porous mineral building materials, preferably ones from the above list.

Particular preference is given to autoclaved aerated concrete, foamed concrete, foamed cement, and lime foam and very particular preference to autoclaved aerated concrete.

The materials have a sulfate content of not more than 1.5% by weight, preferably not more than 1.0% by weight, particularly preferably not more than 0.7% by weight, in each case based on the total weight of the materials.

In an especially preferred embodiment, the materials do not contain any measurable proportion by weight of sulfate.

The materials according to the invention are thus low in sulfate or sulfate-free.

The sulfate content can be detected/determined by X-ray fluorescence analysis on the material or on samples of the material.

In addition, the materials preferably have a content of biopolymers in the range from 0.001% by weight to 5.00% by weight, more preferably from 0.01% by weight to 2.50% by weight, particularly preferably from 0.05% by weight to 1.00% by weight, most preferably from 0.1% to 0.50% by weight, based on the total weight of the materials.

The biopolymer component can after extraction from the material be detected and determined by the usual detection methods such as FTIR, Raman spectroscopy or gas chromatography, as described in the methods section.

The biopolymers are preferably biopolymers that form a hydrogel and form crosslinks via divalent ions such as calcium or magnesium ions, preferably calcium ions.

The biopolymers are preferably temperature-resistant and/or stable over a wide pH range, preferably in the alkaline range.

The materials may comprise one or more biopolymers. It is preferable that the materials comprise a biopolymer.

Preferred biopolymers are polysaccharides such as alginic acid and derivatives thereof, pectin(s) and derivatives thereof, poly-L-guluronic acid and derivatives thereof, poly-D-mannuronic acid and derivatives thereof, agar-agar, carrageenan, furcellaran, tragacanth, gum arabic, xanthan gum, karaya gum, gellan gum and mixtures thereof, preferably alginic acid and derivatives thereof, pectin(s) and derivatives thereof, and mixtures thereof, more preferably alginic acid and derivatives thereof and mixtures thereof.

Derivatives are in this context for example salts, esters, amides or glycols.

Preferred alginic acid derivatives are salts of alginic acid such as sodium alginate, potassium alginate, ammonium alginate, calcium alginate, and propylene glycol alginate.

Preferred pectin derivatives are high-ester pectins having a degree of esterification of more than 50%, low-ester pectins having a degree of esterification of 5-50%, pectic acids, and amidopectins.

Particularly preferred biopolymers are alginic acid, sodium alginate, and ammonium alginate, with very particular preference given to alginic acid and ammonium alginate.

It is preferable that the materials have no detectable content of plasticizers, for example surface-active substances such as naphthalene sulfonates or lignin sulfonates, or dispersing substances, such as melamine resins, polycarboxylates or polycarboxylate ethers.

The materials can be produced in all known dry bulk density classes.

The materials therefore preferably have a dry bulk density of 50 to 1000 kg/m$^3$.

The process described below for producing the materials according to the invention is however seen to best advantage most of all when producing materials having low dry bulk densities.

In a special embodiment, the materials therefore preferably have a dry bulk density of 50 to 400 kg/m$^3$.

Especially for materials such as foamed concrete or foamed cement, the present invention allows lower dry bulk densities of up to 120 kg/m$^3$ or even 100 kg/m$^3$ to be achieved.

In a further aspect, the present invention relates to a process for producing calcium-containing porous mineral materials as described herein, comprising the following process steps:

a) producing an aqueous suspension comprising a calcium oxide source, optionally one or more further mineral raw material sources, and one or more biopolymers;
b) producing a green body from the suspension from process step a);
c) hardening of the green body from process step b);
d) obtaining the calcium-containing porous mineral material.

The process according to the invention here encompasses processes in which the green body is hardened by autoclaving, for example in the production of autoclaved aerated concrete. The process in this case comprises the following process steps:

a) producing an aqueous suspension comprising a calcium oxide source, a silicate source, and one or more biopolymers;
b) producing a green body from the suspension from process step a);
c) autoclaving the green body from process step b) in saturated steam at a temperature within a range from 100° C. to 200° C.;
d) obtaining the calcium-containing porous mineral material.

In a further embodiment of the process according to the invention, the green body can be hardened in air at room temperature or at elevated temperature in a drying cabinet or heating oven. The process in this case comprises the following process steps:

a) producing an aqueous suspension comprising a calcium oxide source, optionally further mineral raw material sources, and one or more biopolymers;

b) producing a green body from the suspension from process step a);

c) hardening of the green body from process step b) in air at room temperature or at elevated temperature in a drying cabinet or heating oven;

d) obtaining the calcium-containing porous mineral material.

In a further embodiment of the process according to the invention, in the production of foamed concrete by way of example, proteins, surfactants, aluminum powder (optionally with adjustment of the pH of the suspension) and further substances used for this purpose, optionally in the form of a preprepared foam, are for example added to the suspension undergoing porosification. The mineral foam thus produced can then be poured into an appropriate mold. The resulting green body is usually hardened in air. Suitable processes for this embodiment are described for example in DE 19632666 C1 or DE 10314879 A1.

The suspension is preferably produced according to process step a) by mixing a dry compound with water.

The dry compound comprises a mixture of a calcium oxide source, optionally one or more further mineral raw material sources, and one or more biopolymers and optionally further additives.

The calcium oxide source is preferably selected from lime such as quicklime or slaked lime or mixtures thereof.

Preferably, the lime source does not contain any cement or calcium sulfate sources such as gypsum/anhydrite/bassanite.

Depending on the material to be produced, the dry compound may contain one or more further mineral raw material sources.

In the production of autoclaved aerated concrete, by way of example, a silicate source, preferably selected from quartz sand, fly ash, and amorphous silicates or mixtures thereof, is usually added to the dry compound as a further mineral raw material source.

The biopolymers are preferably biopolymers that form a hydrogel and form crosslinks via divalent ions such as calcium or magnesium ions, preferably calcium ions.

The biopolymers are preferably temperature-resistant and/or stable over a wide pH range, preferably in the alkaline range.

Preferred biopolymers are polysaccharides such as alginic acid and derivatives thereof, pectin(s) and derivatives thereof, poly-L-guluronic acid and derivatives thereof, poly-D-mannuronic acid and derivatives thereof, agar-agar, carrageenan, furcellaran, tragacanth, gum arabic, xanthan gum, karaya gum, gellan gum, and mixtures thereof, preferably alginic acid and derivatives thereof, pectin and derivatives thereof, and mixtures thereof, more preferably alginic acid and derivatives thereof and mixtures thereof.

Derivatives are in this context for example salts, esters, amides or glycols.

Preferred alginic acid derivatives are salts of alginic acid such as sodium alginate, potassium alginate, ammonium alginate, calcium alginate, and propylene glycol alginate.

Preferred pectin derivatives are high-ester pectins having a degree of esterification of more than 50%, low-ester pectins having a degree of esterification of 5-50%, pectic acids, and amidopectins.

Particularly preferred biopolymers are alginic acid, sodium alginate, and ammonium alginate, with very particular preference given to alginic acid and ammonium alginate.

The proportion of calcium oxide sources in the dry compound is preferably within the usual range for the respective material.

In the case of autoclaved aerated concrete, the proportion of calcium oxide sources in the dry compound is usually 20% to 50% by weight, preferably 25% to 48% by weight, more preferably 28% to 45% by weight, based on the total weight of the dry compound.

The proportion of possible further sources of raw materials in the dry compound is preferably within the usual range for the respective material.

In the case of autoclaved aerated concrete, the proportion of silicate sources in the dry compound is usually 35% to 60% by weight, preferably 40% to 58% by weight, more preferably 45% to 55% by weight, based on the total weight of the dry compound.

The proportion of biopolymers in the dry compound is usually 0.001% to 5.0% by weight, preferably 0.1% to 2.5% by weight, more preferably 0.2% to 1.0% by weight, based on the total weight of the dry compound.

Further additives may also be added to the dry compound.

In the production of materials according to the usual processes of the prior art, a binder such as calcium oxide, cement, gypsum/anhydrite/bassanite or the like is usually added to the dry compound or to the suspension, which serves to give the green body a certain degree of stability.

In the production of materials by the process according to the invention, the addition of the biopolymers means that cement, specifically portland cement, can be completely or partially dispensed with as a binder. In some embodiments, the use of binders can even generally be dispensed with altogether. In some other embodiments, the proportion of binders can generally be significantly reduced.

Examples of suitable binders in the process according to the invention are cement, CA cement, hydraulic lime, quicklime, clay, loam, resins, waxes, and alkali-activated binder systems.

It is preferable that the binders have a low sulfate content or no measurable sulfate content.

The proportion of possible binders in the dry compound is preferably within the usual range for the respective material. In some embodiments, a lower proportion of binder than is customary can be employed. In some other embodiments, binders can be dispensed with altogether.

In the case of autoclaved aerated concrete, the proportion of cement-based binders in the dry compound is usually 0% to 20% by weight, preferably 1% to 17% by weight, more preferably 3% to 15% by weight, based on the total weight of the dry compound.

The dry compound or the suspension may comprise pore formers. These are preferably added to the suspension. Examples of pore formers are a reactive metal powder, hydrogen peroxide, etc.

In the production of some materials, other porosification processes are employed instead of pore formers.

Porosification through pore formers or other porosification processes serves for the adjustment of the density of the materials.

The proportion of possible pore formers in the dry compound is preferably within the usual range for the respective material.

It is particularly preferable that the dry compound contains the lowest possible proportion of sulfate-containing materials such as gypsum, portland cement, anhydrite or bassanite or mixtures thereof.

The dry compound preferably contains sulfate-containing materials in a weight proportion of 0% to 10% by weight, more preferably 0% to 8% by weight, particularly preferably 0% to 5% by weight, based on the total weight of the dry compound.

In a very particularly preferred embodiment, the dry compound does not contain any sulfate-containing materials such as gypsum, portland cement, anhydrite, bassanite or mixtures thereof.

The dry compound preferably does not contain any plasticizers selected from surface-active substances, such as naphthalene sulfonates or lignin sulfonates, or dispersing substances, such as melamine resins, polycarboxylates or polycarboxylate ethers.

The suspension is produced from the dry compound by adding water.

In process step b), a green body is formed from the suspension as described above.

This is done usually by transferring the suspension to a mold that is preferably coated or wetted with a release agent.

The suspension usually foams and swells in the mold through the formation of gas bubbles from a chemical reaction of the pore former with the calcium oxide source.

In some embodiments, such as in the production of foamed concrete or foamed cement, the suspension is usually first foamed and the mineral foam then transferred to a mold.

In some embodiments, the suspension after foaming usually partially sets into a cake to an extent such that it can be cut into blocks, thereby affording the green body. The partial setting time is here preferably within the usual range for the respective material.

The green body can be investigated in respect of the above constituents. The proportions of calcium oxide sources, optional further raw material sources, biopolymers, and further optional additives can be recalculated to the above-mentioned proportions in the dry compound by subtracting the proportion of water in the green body.

Preferably, no additives are added to the green body that increase the proportion of sulfate and/or plasticizers in the green body.

In process step c), the green body from process step b) is hardened.

Suitable processes for hardening the green body are:

- Hydrothermal hardening, autoclaving/steam hardening (autoclaved aerated concrete, autoclaved mineral insulation materials)
- Hydraulic setting or "hardening" in air at room temperature (foamed concrete, mineral insulating materials, cement- and/or lime-based)
- Hydraulic setting or "hardening" at elevated temperature in ovens (60 to 200° C.) (foamed concrete, mineral insulating materials, cement- and/or lime-based)
- "Hardening" and "hardening" by microwave excitation (physical and chemical setting of alkali-activated binder systems (geopolymers))
- Thermal setting or "hardening", sintering (firing) at a greatly elevated temperature, for example in kilns at 600° C. and above (refractory ceramics, porous and nonporous refractory concretes, ceramic insulating materials, ceramic foams), before the sintering process (firing), the "green bodies" are dried at moderate temperatures (approx. 120° C.) so that no cracks form during subsequent sintering.
- Setting or "hardening" by carbonation in air with the $CO_2$ present therein (porosified air-hardening lime mortar, lime foam)
- Setting or "hardening" by carbonation in a $CO_2$ atmosphere (porosified air-hardening lime mortar, lime foam)
- Setting or "hardening" by carbonation in liquid $CO_2$ in pressure vessels (porosified air-hardening lime mortar, lime foam)

In one embodiment, the green body is hardened by autoclaving. This embodiment is used with preference in the production of autoclaved aerated concrete in accordance with the invention.

In this embodiment, the green body from process step b) is then in the following process step autoclaved in a saturated steam atmosphere at an elevated temperature of 100 to 250° C.

The autoclaving conditions are not specific to this embodiment of the process according to the invention and can be selected from the conditions known in the prior art in accordance with the materials used and the desired property profile to be achieved for the materials.

Process step c) usually takes place in an autoclave.

Steam is usually supplied via a steam generator.

Autoclaving is usually carried out over a period of 2 to 15 hours, preferably 3 to 12 hours.

During this process, the green body hardens, resulting in the formation of the calcium-containing porous mineral material, preferably an autoclaved aerated concrete.

This is obtained at the end of process step c).

The calcium-containing porous mineral material thus obtained, preferably autoclaved aerated concrete, preferably has all the features and properties described herein.

In the process according to the invention, the biopolymers added to the suspension take on various roles:

Firstly, the biopolymers ensure stabilization of the green body. This stabilization permits high porosification and thus a reduction in the dry bulk density of the material. The stabilization of the green body can be observed especially in materials such as foamed concrete, foamed cement, alkali-activated building materials, porous refractory materials, porous mineral insulating materials for the construction industry based on foamed concrete, porous mineral insulating materials for industrial insulation based on foamed concrete, foamed ceramics, foamed lime, porous air-hardening lime, porous mineral-based sound absorbers or porous granulates for lightweight concrete as described above.

Another central role of the biopolymers is their strength-boosting function. This allows the proportion of binders, especially cement and particularly especially portland cement, to be reduced in some materials, which results in a reduction in the sulfate content of such materials and also greatly reduces the $CO_2$ equivalents of the final material. This property of the biopolymers can be observed especially in materials such as autoclaved aerated concrete, porous mineral insulating materials for the construction industry based on autoclaved aerated concrete, porous mineral insulating materials for industrial insulation based on autoclaved aerated concrete or porous mineral-based sound absorbers as described above.

In addition, biopolymers can regulate the water balance during the production process by positively influencing the water retention capacity of the mixture.

Biopolymers also contribute to adjustment of the flowability and of the shear properties.

Overall, the biopolymers are able to partially or completely imitate the function of calcium sulfate and thus replace it.

It is thought that these tasks are associated with the property of the employed biopolymers to form crosslinks with divalent ions such as calcium or magnesium ions.

The ions are here complexed by the polymer chains, with the formation of structures reminiscent of an egg box, resulting in the formation/additional stabilization of a hydrogel.

The structures are illustrated in FIG. 1, taking calcium alginates as an example (source: Fu, Shao; Thacker, Ankur; Sperger, Diana M.; Boni, Riccardo L.; Buckner, Ira S.; Velankar, Sachin et al. (2011): Relevance of rheological properties of sodium alginate in solution to calcium alginate gel properties. In: AAPS PharmSciTech 12 (2), pp. 453-460).

This alters the viscosity and shear properties of the base compound during the mixing process. The system is also influenced by the fact that the calcium ions are held in the hydrogel system.

In addition, the hydrogel acts also as a regulator for the water balance, which in turn can have a beneficial effect on a subsequent autoclaving process.

Figure 2:
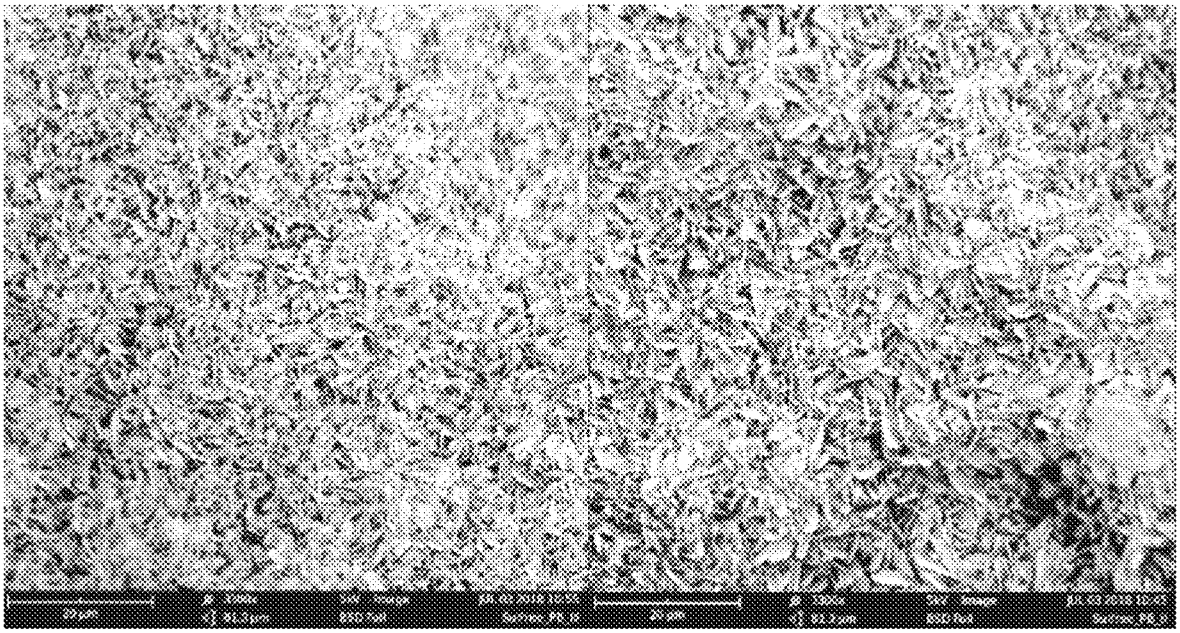
FIG. 2 shows the condition of the inner surface of autoclaved aerated concrete with addition of ammonium alginate (left) or sodium alginate (right) through scanning electron microscope (SEM) images.

FIG. 2 shows the surface structures of autoclaved aerated concrete with addition of sodium alginate (left) and ammonium alginate (right). Both show uniform platelet formation, the effect seemingly being even more pronounced when ammonium alginate is added.

The biopolymers can therefore imitate and take on the role of the gypsum/anhydrite/bassanite or binders (especially portland cement).

The abovementioned effects can be achieved here even with low proportions by weight of biopolymer in the materials according to the invention, with the result that only a small proportion of biopolymer of not more than 1.00% by weight is detectable in the finished material. This low proportion by weight means that no laborious approval processes are necessary for the materials. However, it also possible to add biopolymers in larger amounts, this being generally limited only by economic considerations in respect of the costs for the raw materials and the necessary additional approval processes.

Through the use of biopolymers as stabilizers it is thus possible for the proportion of sulfate-containing materials and plasticizers to be significantly or even completely reduced.

This results in economic and ecological advantages for this type of material. For example, the $CO_2$ equivalents can be significantly reduced by dispensing with cement. Moreover, the reduction in the sulfate contents means that the materials fall into a lower landfill class and can be recycled more advantageously.

In a further aspect, the present invention relates to the use of biopolymers for producing low-sulfate, calcium-containing porous mineral materials.

The biopolymers and the low-sulfate, calcium-containing porous mineral materials preferably have all the features and properties described herein.

The properties of the biopolymers as stabilizers are preferably subject to the effects described herein.

EXAMPLES

1. Measurement Methods a) Density

The dry bulk density was determined in accordance with DIN EN 772-13 after drying the cubes at a temperature of 105±5° C. in an oven until constant weight.

b) Detection of Biopolymers in the Material

The biopolymers in the material were detected by extraction with the aid of a solvent and subsequent analysis of the extract:

Samples (10 g) of the end products were ground and added to an alcoholic solution (methanol, ethanol, etc.). The amount of solvent is not critical and can be chosen disproportionately, as in the present case (1 part solid, 10 parts solvent). A shaking table, stirrer, shaker or similar can also be used to accelerate the process. The liquid mixture was in the present case drawn off after 2 weeks. The suspended matter still present in the mixture was removed by centrifugation. The solvent was then removed by evaporation. This was done by transferring the mixture to a petri dish and warming gently. The solid left behind at the bottom was then subsequently identified via IR spectroscopy (FTIR). Other methods of analysis are however also possible (Raman, GC/MS, etc.).

c) X-ray Fluorescence Analysis (XRF) to Determine the Proportions by Weight of the Ingredients in the Material For the XRF analysis, pellets of the material samples were first produced:

The sample was ground using a planetary ball mill with a tungsten carbide grinding tool. This was done by placing 4-6 ml of sample in the grinding jar with five grinding balls and grinding at 300 rpm for three minutes. The ground sample was passed through an analysis sieve with a mesh size of 50 μm. Any residue on the sieve was ground again for three minutes at 300 rpm. This process was repeated until the entire sample had a particle size of <50 μm. Because of the multiple grinding operations, the overall sample had to be homogenized by placing it in a sample jar and shaking for one minute. The use of other types of mills, grinding media, and grinding parameters is also conceivable.

To prepare the pellet, five grams of the previously comminuted sample was mixed with 1.25 g of binder, typically wax, in a sample jar by adding three small steel balls and shaking the jar for one minute. The homogenized sample-binder mixture was introduced via a 50 μm sieve into the prepared press tool and pressed at a pressure of 25 t for one minute. After one minute the pressure was slowly released. Care was taken to ensure that the air did not escape abruptly, since this can result in the formation of cracks in the tablet. The finished pellet was inspected and assessed according to the following criteria:

- evenness of the surface
- homogeneity of the surface (aim: no visible separation of binder and sample)

An X-ray spectrometer with helium flow was used for the XRF analysis. The finished pellets were introduced into the X-ray spectrometer, which was ready to use, and brought to the measuring position. When measuring samples of unknown composition, a qualitative analysis must first be carried out in order to identify possible overlapping of lines. The reference samples must be measured under the same conditions.

The measurement data were opened and evaluated with the appropriate software.

2. Preparation of the Suspensions

A suspension was produced from dry compound as per Table 1 and water, with a ratio of water to dry compound of 0.7.

TABLE 1

Composition of the dry compound of the suspension

| Material | Proportion in the dry compound [% by weight] |
|---|---|
| Quartz sand | 53.95 |
| Cement | 10.00 |
| Calcium oxide | 26.00 |
| Limestone powder | 10.00 |
| Biopolymer | 0.05 |

The biopolymer used was alginic acid (sample 1), ammonium alginate (sample 2), and sodium alginate (sample 3), in each case in the proportion stated above. Three different suspensions containing different biopolymers were thus prepared.

3. Production of Autoclaved Aerated Concrete

The three suspensions were poured into molds. After the expansion process, the partially set green bodies were then autoclaved in an autoclave under the following conditions:

Duration: 6 hours

Pressure: 12-13 bar absolute (saturated steam)

Temperature: Approx. 180-195° C.

The mineral materials (autoclaved aerated concrete) obtained in this way have the following chemical compositions, as listed in Table 2. The proportions by weight of the various ingredients in the autoclaved aerated concretes were determined by X-ray fluorescence analysis.

TABLE 2

Chemical composition of the autoclaved aerated concrete of samples 1-3:

| Sample 1 Ingredient | Proportion | Unit |
|---|---|---|
| MgO | 0.571 | % by wt. |
| $Al_2O_3$ | 1.384 | % by wt. |
| $SiO_2$ | 50.87 | % by wt. |
| $SO_3$ | 0.482 | % by wt. |
| $K_2O$ | 0.258 | % by wt. |
| CaO | 45.655 | % by wt. |
| $TiO_2$ | 653 | ppm |
| $Fe_2O_3$ | 0.443 | % by wt. |
| NiO | 7 | ppm |
| CuO | 45.2 | ppm |
| SrO | 420.4 | ppm |
| $ZrO_2$ | 66.2 | ppm |
| $Ag_2O$ | 0.172 | % by wt. |
| $SnO_2$ | 124.7 | ppm |
| **Sample 2 Ingredient** | **Proportion** | **Unit** |
| MgO | 0.623 | % by wt. |
| $Al_2O_3$ | 1.281 | % by wt. |
| $SiO_2$ | 50.282 | % by wt. |
| $SO_3$ | 0.511 | % by wt. |
| $K_2O$ | 0.24 | % by wt. |
| CaO | 46.259 | % by wt. |
| $TiO_2$ | 606 | ppm |
| $Fe_2O_3$ | 0.454 | % by wt. |
| CuO | 43.5 | ppm |
| ZnO | 36.8 | ppm |
| SrO | 419.8 | ppm |
| $ZrO_2$ | 70.8 | ppm |
| $Ag_2O$ | 0.179 | % by wt. |
| $SnO_2$ | 132.5 | ppm |
| **Sample 3 Ingredient** | **Proportion** | **Unit** |
| MgO | 0.567 | % by wt. |
| $Al_2O_3$ | 1.292 | % by wt. |
| $SiO_2$ | 50.237 | % by wt. |
| $SO_3$ | 0.504 | % by wt. |
| $K_2O$ | 0.248 | % by wt. |
| CaO | 46.335 | % by wt. |
| $TiO_2$ | 612.4 | ppm |
| $Fe_2O_3$ | 0.458 | % by wt. |
| CuO | 35.1 | ppm |
| ZnO | 34.5 | ppm |
| SrO | 421.1 | ppm |
| $ZrO_2$ | 64.2 | ppm |
| $Ag_2O$ | 0.186 | % by wt. |
| $SnO_2$ | 145 | ppm |

Figure 3:
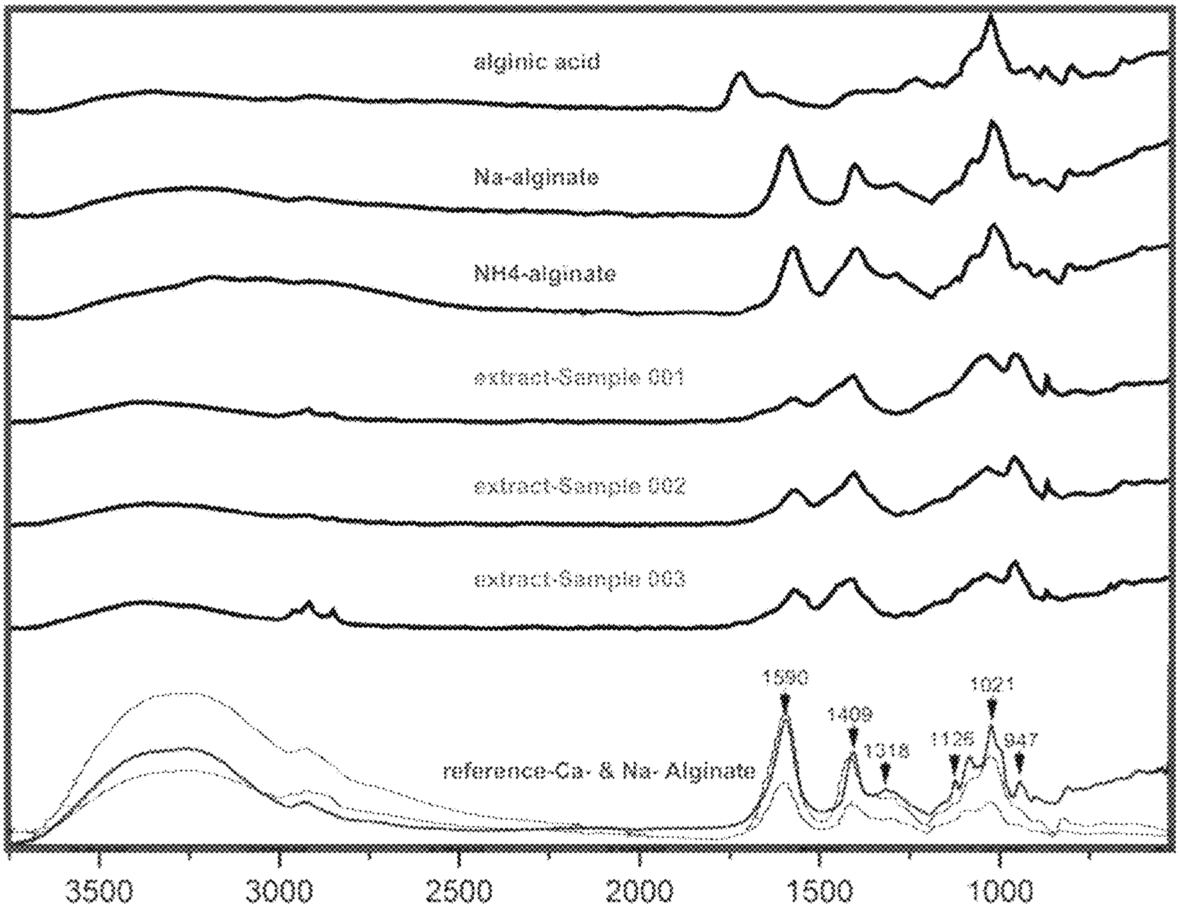
FIG. 3 shows the FTIR spectra of alginic acid, ammonium alginate, and sodium alginate and of the extracts of the three autoclaved aerated concrete blocks produced in the examples section with alginic acid (sample 1), ammonium alginate (sample 2), and sodium alginate (sample 3). At the bottom of the figure, the respective reference spectra (Na alginate, Ca alginate) are superimposed and the relevant peaks illustrated.

Material samples of the autoclaved aerated concretes of samples 1-3 were further investigated in respect of their alginic acid or alginate content by FTIR according to measurement method b) described above. In the FTIR spectra in FIG. 3, peaks are identifiable that can be assigned to alginic acid or to salts thereof. The addition of biopolymers can thus be detected in the end product.

The invention claimed is:

1. A calcium-containing porous mineral material having a sulfate content of not more than 1.5% by weight and a content of biopolymers in the range from 0.001% to 5.00% by weight, in each case based on the total weight of the materials, wherein the biopolymers are biopolymers which form a hydrogel and form crosslinks via divalent ions, and the calcium-containing porous mineral material having a dry bulk density of 50 kg/m$^3$ to 1000 kg/m$^3$.

2. The material according to claim 1, which has no detectable content of plasticizers.

3. The material according to claim 1, wherein the biopolymers comprising polysaccharides including alginic acid and derivatives thereof, pectin and derivatives thereof, poly-L-guluronic acid and derivatives thereof, poly-D-mannuronic acid and derivatives thereof, carrageenan, furcellaran, tragacanth, gellan gum, or mixtures thereof.

4. The material according to claim 1 is selected from the following list:

Autoclaved aerated concrete

Foamed concrete/foamed cement

Alkali-activated building materials

Porous refractory materials, which are materials that are used in high-temperature processes or for lining furnaces or thermal aggregates Porous mineral insulation materials for the construction industry based on foamed concrete or aerated concrete Porous mineral insulation materials for industrial insulation of pipes, containers, boilers, furnaces, heating cabinets based on foamed concrete or aerated concrete Foamed ceramic Lime foam Porous air-hardening lime hardened by carbonation in air or a $CO_2$-enriched atmosphere or in liquid $CO_2$ Mineral-based porous sound absorbers Porous granulates for lightweight concrete.

5. The material according to claim 3, wherein the alginic acid and derivatives thereof are selected from alginic acid, sodium alginate, potassium alginate, ammonium alginate, calcium alginate, or propylene glycol alginate.

6. The material according to claim 3, wherein the pectin and derivatives thereof are selected from a high-ester pectin having a degree of esterification of more than 50%, low-ester pectin having a degree of esterification of 5-50%, pectic acid, and amidopectin.

7. The material according to claim 4, wherein the alkali-activated building materials are geopolymers, the porous refractory materials are refractory ceramics or refractory concrete, the foamed concrete is hydraulic concrete, and the aerated concrete is autoclaved aerated concrete.

8. A process for producing calcium-containing porous mineral materials according to claim 1, comprising:

a1) providing a dry compound, which comprises a mixture of a calcium oxide source, optionally one or more further mineral raw material sources, and one or more biopolymers;

a) producing an aqueous suspension by mixing the dry compound with water;

b) producing a green body from the suspension from process step a);

c) hardening of the green body from process step b);

d) obtaining the calcium-containing porous mineral material.

9. The process as claimed in claim 8, wherein the biopolymers comprise polysaccharides including alginic acid and derivatives thereof, pectin and derivatives thereof, poly-L-guluronic acid and derivatives thereof, poly-D-mannuronic acid and derivatives thereof, carrageenan, furcellaran, tragacanth, gellan gum, or mixtures thereof.

10. The process according to claim 8, wherein the dry compound of the suspension contains sulfate-containing materials in a weight proportion of 0% to 10% by weight based on the total weight of the dry compound.

11. The process according to claim 10, wherein the sulfate-containing materials comprise gypsum, anhydrite, bassanite, portland cement, or mixtures thereof.

12. The process according to claim 8, wherein the dry compound of the suspension is free of plasticizers.

13. The process of claim 9, wherein the alginic acid and derivatives thereof are selected from alginic acid, sodium alginate, potassium alginate, ammonium alginate, calcium alginate, or propylene glycol alginate.

14. The process of claim 9, wherein the pectin and derivatives thereof are selected from a high-ester pectin having a degree of esterification of more than 50%, low-ester pectin having a degree of esterification of 5-50%, pectic acid, and amidopectin.

* * * * *